United States Patent [19]

Auriemma

[11] 4,332,403

[45] Jun. 1, 1982

[54] CAM LOCK FOR A SPIGOT

[75] Inventor: Joseph F. Auriemma, Point Pleasant, N.J.

[73] Assignee: Ciba-Geigy Corporation, Ardsley, N.Y.

[21] Appl. No.: 186,560

[22] Filed: Sep. 12, 1980

[51] Int. Cl.³ ............................................. F16L 5/00
[52] U.S. Cl. .................................. 285/189; 137/360; 285/8; 285/39; 285/312; 411/400
[58] Field of Search ...................... 285/8, 39, 309, 310, 285/311, 312, 320, 189; 137/354, 360; 29/157 R, 238, 267; 411/400; 403/374

[56] References Cited

U.S. PATENT DOCUMENTS

| | | |
|---|---|---|
| 317,985 | 5/1885 | Forncrook . |
| 733,541 | 7/1903 | Clegg . |
| 939,932 | 11/1909 | Towle ..................................... 285/8 |
| 1,427,893 | 9/1922 | Babcock . |
| 2,778,083 | 1/1957 | Impurato ........................... 24/263 B |
| 3,035,322 | 5/1962 | Ibeck .................... 24/263 B |
| 3,093,220 | 6/1963 | Modrey ............................. 24/263 B |
| 3,870,630 | 3/1975 | Tylinski . |
| 4,281,857 | 8/1981 | Randall .................................. 285/34 |

Primary Examiner—Dave W. Arola
Attorney, Agent, or Firm—Wenderoth, Lind & Ponack

[57] ABSTRACT

A securing device for attaching and holding a press plate spigot to a base member of a filter press. The device includes lugs which are received through openings in the spigot, the lugs being attached to the base member levers having a crank arm made up of protruding portions and a cam surface and having the protruding portions received in cutouts of the lugs so that levers are rotated about an arc for having the cam surfaces urge and hold the spigot against the base plate.

5 Claims, 6 Drawing Figures

CAM LOCK FOR A SPIGOT

BACKGROUND OF THE INVENTION

In a filter press wherein a spigot and more particularly, a press plate spigot is used to drain filtrate from a press plate, the spigot must at times be replaced with a different kind of spigot or with an identical one as a result of breakage of the original spigot. Because of the nature of the operations, it is essential that the press plate spigot be removed quickly and easily. In addition to being capable of easy and quick replacement, the press plate spigot must be mounted securely while in use. Prior art attaching devices have usually included lugs having threaded portions on the outside for having the spigot mounted on the lugs and held securely by bolts which are threaded tightly onto the lugs. These systems have the disadvantage that they require a lot of time for the threading and tightening of the bolts and as a result, they do not allow for quick and easy changing of the spigot. Other devices such as cotter or split pins also fail to perform the required functions in that they either do not hold the spigot in a sufficiently secure fashion, or they take too long to fasten and unfasten.

SUMMARY OF THE INVENTION

It is thus an object of the present invention to provide a fastening device for a press plate spigot which allows for quick and easy attachment and release of said spigot on a filter press.

Another object of the present invention is to provide a fastening device which clamps a press plate spigot securely to a filter press.

To accomplish these objects, two lugs are provided which are attached to a base member of a filter press. Each lug has a cut out portion and the lugs are received in two openings which extend through a base plate of the spigot. Two levers, having a crank arm at one end which includes a protruding portion on one side and a cam surface on the other with the other, are then used to lock the spigot firmly against the base member. Each protruding portion of each lever is inserted into the cut out portion of each respective lug and then, the lever is rotated about the center of rotation of the crank arm so that the cam surface of the lever contacts the surface of the spigot base plate to urge it against the base member and firmly wedge it thereon.

BRIEF DESCRIPTION OF THE DRAWINGS

To accomplish these and other objects, there follows a detailed description of the invention which is made with reference to the attached drawings in which.

DETAILED DESCRIPTION OF THE INVENTION

Figures 1, 6:
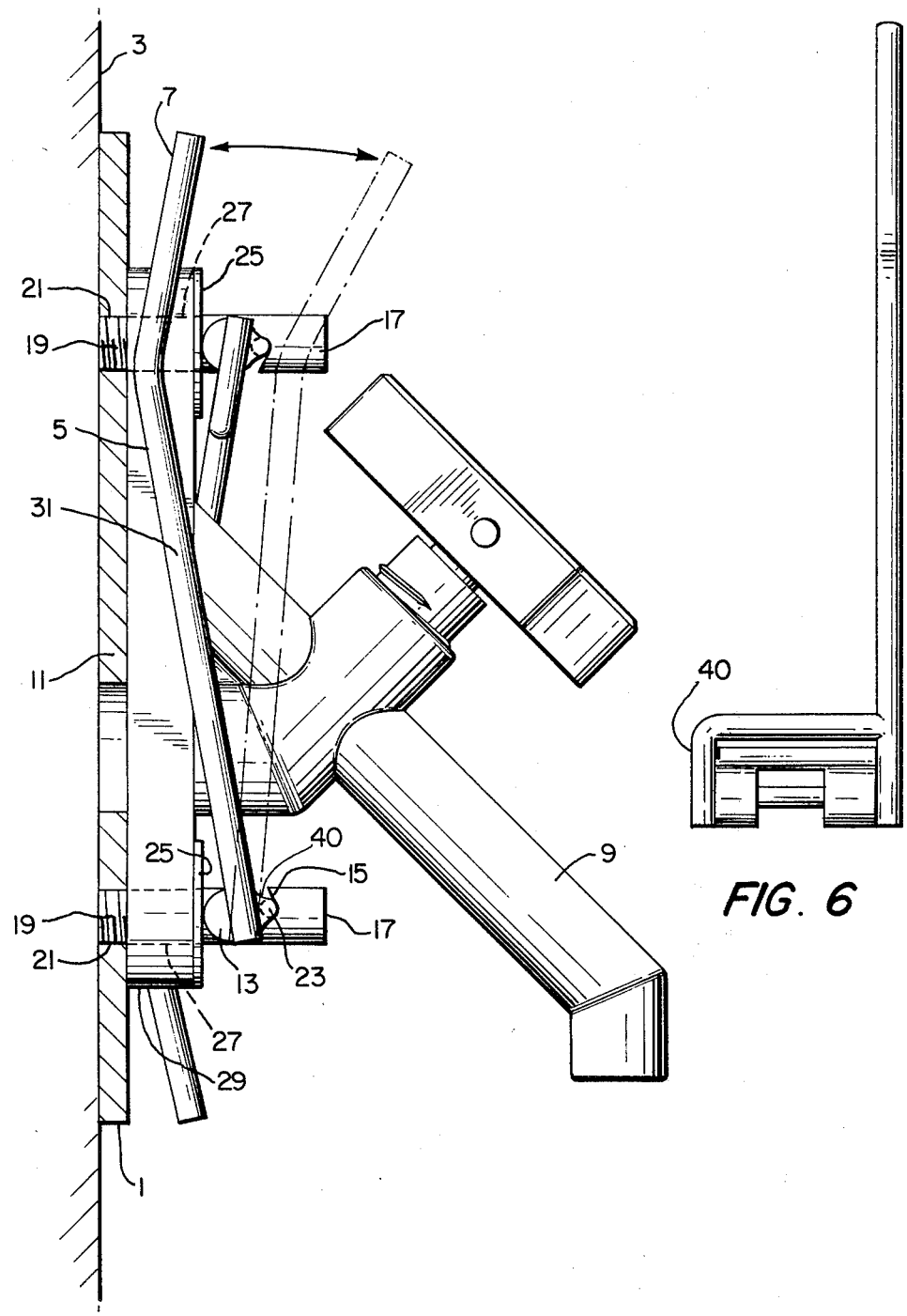
FIG. 1 is a side view of the locking assembly of the present invention in combination with a press plate spigot which is mounted on a filter press.
FIG. 6 is a bottom view of the lever of FIG. 5 showing the cam surfaces.

A filter press of the type contemplated herein includes a press plate spigot 9 which is used to drain filtrate from a press plate. The press plate spigot 9 is normally secured to a base member 1 constituted by a press plate.

The securing and attaching means of the present invention includes lugs 17 which include threaded portions 19 for threading into threaded openings 21 in the base member 1. The lugs 17 also include cut out portions 15 which extend transversely and are downwardly inclined and face the spigot 9.

When the spigot 9 is in position, the lugs 17 fit and are received through the base plate 29 of the spigot 9.

Figure 2:
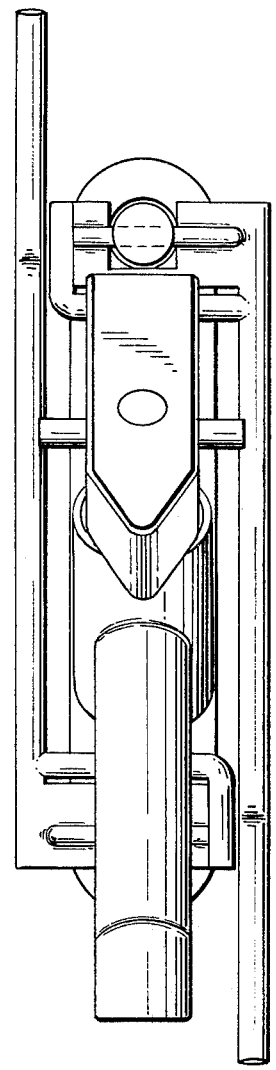
FIG. 2 is a plan view of the assembly shown in FIG. 1.
Figure 4:
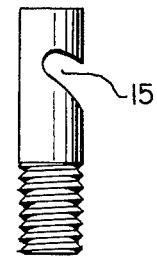
FIG. 4 is a side view of the locking lug of the present invention.
Figure 3:
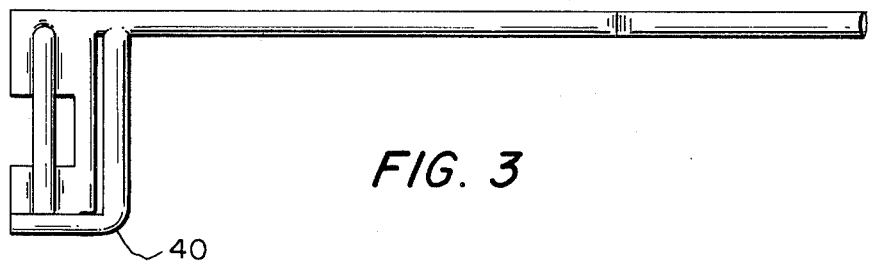
FIG. 3 is a top view of the locking lever of the present invention showing the crank arm portion.
Figure 5:
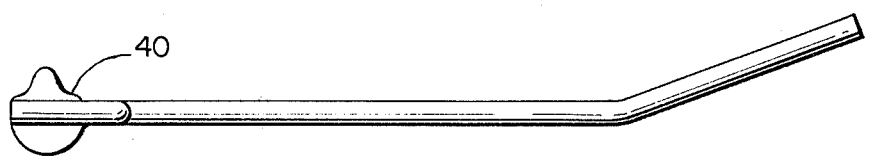
FIG. 5 is a side view of the lever of FIG. 3.

For locking and securing the spigot 9 onto the base member 1, there are provided levers 5. Levers 5 have a longer portion 31 and a short inclined portion 7 at one end thereof which serves as a handle. The other end of the lever 5 includes a crank arm 40 which includes a protruding portion 23 on one side, as shown in FIGS. 1, 2 and 5, and cam surfaces 13 on the other side. There are two cam surfaces 13 which are positioned on each side of the lugs for exerting a balanced force on the base plate 29.

When the press plate spigot 9 is to be secured or attached to the base member 1, the base plate 29 of the spigot 9 is mounted on lugs 17 which are received through openings 25. The levers 9 are then placed in the position, as shown in FIG. 2 wherein the protruding portion 23 is received in the lug cut out portion 15. The lever 9 is then moved about an arc, from position I as shown by the dotted line of FIG. 1, into the position II shown in FIG. 1. More specifically, movement is about the center of rotation of the crank arm 40. Thus, the cam surface 13 on the lever 5, urges the spigot 9 against the base member 1 until the lever arm 31 passes the plane which is parallel to the base plate 29 of the spigot 9 so that the protruding portion 23 is received fully and locks in the cut out 15.

In order to alleviate the pressure on the base plate 29, washers 25 can be provided which are received on the lugs 17 between the cam surfaces 13 and the base plate 29.

The lugs 17, in this embodiment, are shown as being threaded onto a base member of the filter press. However, any other conventional means such as, for example, welding can be used to secure the lugs.

Having described the preferred embodiment of the invention in great detail, the scope of the invention is defined in the following claims.

What is claimed is:

1. A securing assembly for use in securing a press plate spigot to a base member on a filter press, said securing assembly comprising:
   lug means attached to the base member for receiving said spigot thereon, said lug means extending through openings in a base plate of said spigot and out the side of said base plate away from the base member and said lug means having cut out portions which extend transversely and are downwardly inclined and facing said spigot adjacent said side of said base plate away from said base member; and
   urging means for urging and holding said spigot against said base member, said urging means including a lever having at one end a crank arm comprising a cam surface on one side and an engaging projection on the other side, said engaging projection being received in said cut out portions and said cam surface being for urging said spigot against said base member as said lever is rotated about an arc, said crank arm locking in said lug means when said engaging projection is rotated past the vertical plane which is parallel to said lug means.

2. A securing assembly as in claim 1 wherein said lever includes a portion, at the other end, which is inclined at an angle relative to the main portion of said lever for allowing easy grasping of said lever.

3. A securing assembly as in claim 1 wherein said lug means and urging means comprise at least two.

4. A securing assembly as in claim 1 wherein said cam surface comprises two cam elements for being disposed on each side of said lug means for exerting a balanced force on said spigot base plate.

5. A securing device as in claim 1 further comprising a washer for being located between said cam surface and the base plate said washer being received on said lug means.

* * * * *